Feb. 15, 1938.   E. A. KELLY   2,108,314
MULTIPLE PAYMENT COUPON BOOK
Filed Feb. 10, 1936   3 Sheets-Sheet 2

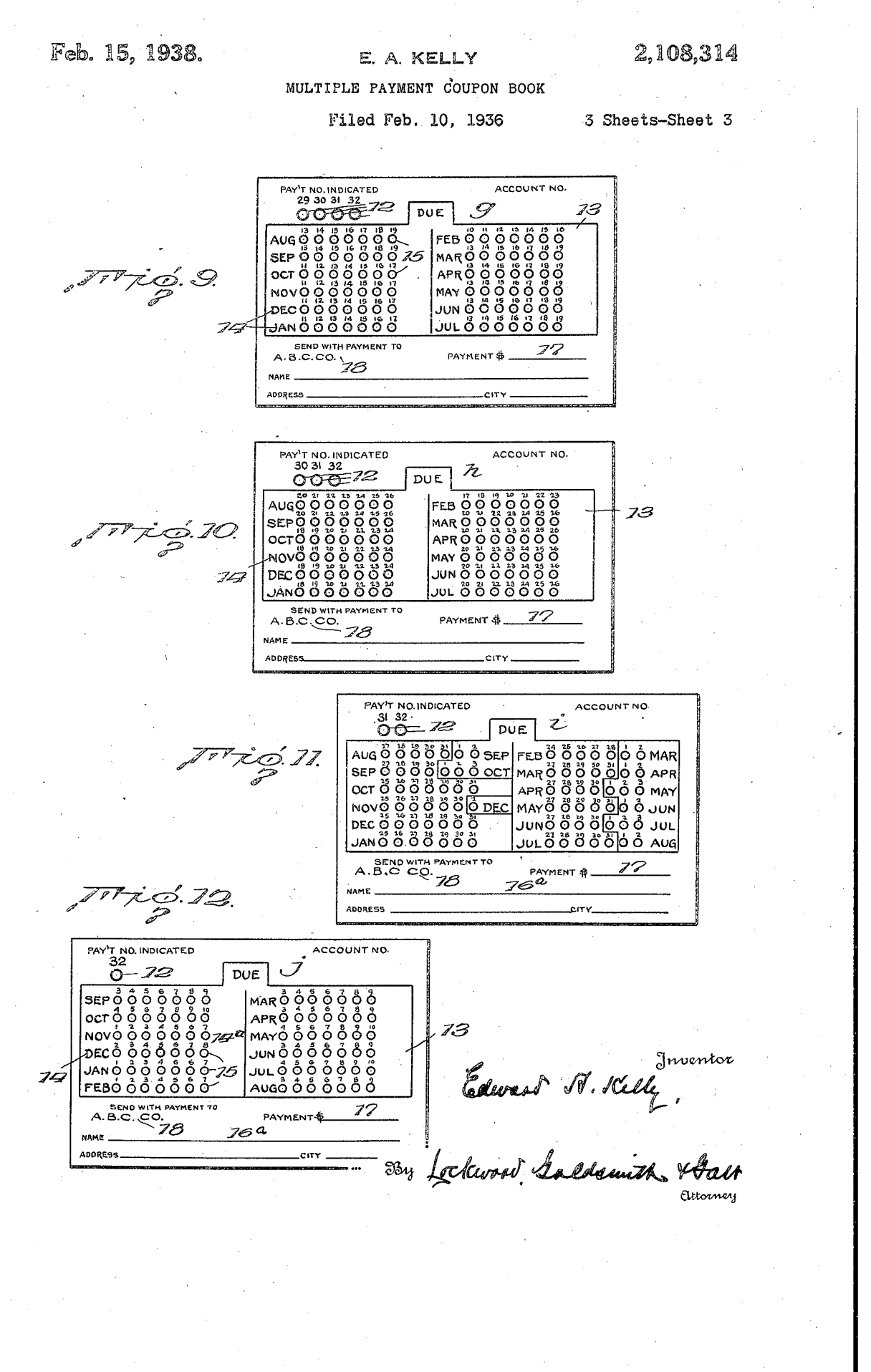

Feb. 15, 1938.   E. A. KELLY   2,108,314

MULTIPLE PAYMENT COUPON BOOK

Filed Feb. 10, 1936   3 Sheets-Sheet 3

Patented Feb. 15, 1938

2,108,314

UNITED STATES PATENT OFFICE 2,108,314

MULTIPLE PAYMENT COUPON BOOK

Edward A. Kelly, Indianapolis, Ind.

Application February 10, 1936, Serial No. 63,250

4 Claims. (Cl. 283—66)

This invention is a multiple payment coupon book primarily designed for use where purchases are made on the deferred payment plan, and involving a plurality of equal payments.

One of the objects of the invention is to provide a multiple payment coupon book for use in making equal weekly payments over any desired period of time. A further object is to provide a coupon book of the type mentioned which will be universal in character, that is, the same coupon book assembly is adapted to provide for any number of weekly payments to commence at any date during any calendar year, no matter which day of any week is selected as the date of initial payment. A further object is to provide a coupon book assembly in which the respective coupons are arranged in superposed relation, in such manner that indicia and data on each coupon are in register with similar indicia and data on all of the other superposed coupons, said superposed coupons and their indicia and data being so constructed and arranged, that a punch hole or the like extending through all of the superposed coupons from the first coupon to the last coupon, will identify the respective coupons for continuously successive due dates separated by increments each representing seven calender days.

The invention will be hereinafter fully set forth and particularly pointed out in the claims.

In the accompanying drawings:—

Figure 1 is a perspective view of a multiple payment coupon book embodying the invention, the cover being shown open so as to expose the first or topmost coupon. Figures 2, 3, 4, 5, and 6 are plan views illustrating respectively the second, third, fourth, fifth and sixth coupons from the top of the book of coupons. Figures 7, 8, 9, 10, 11, and 12 are top plan views illustrating the last six coupons of a book designed for 32 payments, and representing coupons in the order named.

Referring to the drawings, B designates a book of coupons, made up of a plurality of individual sheets, bound together at one end, as indicated at 10, and if desired provided with a suitable cover 11, as shown in Figure 1. Each sheet bound within the book B consists of a coupon portion C and a stub portion S.

Each coupon is provided with indicia designating the payment numbers of the respective coupons. In the form illustrated, this indicia consists of one or more small circles 12, each associated with an identifying numeral. The first coupon $a$ is provided with but one circle 12 and a single identifying ordinal. The second coupon $b$ is provided with two circles 12, and a corresponding number of identifying numbers; the coupon $c$ is provided with three circles 12 each identified by a number; the coupon $d$ with four circles 12 and four identifying numbers; and the coupon $e$ with five of such circles each of which is identified by a number. The coupon $f$ is provided with five of said numbered circles, the coupon $g$ with four, the coupon $h$ with three, the coupon $i$ with two and the coupon $j$ with one. Each coupon intervening between the coupon $e$ and the coupon $f$ contains five of such circles associated with individual identifying numbers. For convenience in keeping records, each stub bears similar circles corresponding in number to those on the coupon to which it is attached, the identifying numbers on the stub being duplicates of those on its coupon.

It will be noted that the circles 12 of all of the coupons are in register with correspondingly positioned circles on all of the other coupons. The single circle 12 of the coupon $a$ is designated by the numeral 1. The two circles on the coupon $b$ are designated by the numerals 1 and 2, and it is to be noted that the circle 2 lies immediately beneath the circle 1 of coupon $a$, so that the circle designated 1 on coupon $b$ is offset from the correspondingly numbered circle of coupon $a$. In a similar manner the coupon $c$ carries three circles numbered respectively 1, 2, and 3, the circle 3 registering with the circles 1 and 2 respectively of the first and second coupons, the circle 2 registering with the circle 1 of coupon $b$ and the circle 1 of coupon $c$ being offset to the left of circle 1 of coupon $b$. Likewise, coupon $d$ is provided with four of such circles numbered from 1 to 4 respectively, the circle 4 lying beneath and registering with circles 1, 2, and 3 of coupons $a$, $b$, and $c$ respectively, the circle 3 lying beneath and in register with circles 1 and 2 of coupons $b$ and $c$ respectively, the circle 2 lying beneath and registering with the circle 1 of coupon $c$, and the circle 1 of coupon $d$ being offset with respect to the circle number 1 of coupon $c$. In a similar manner the coupon $e$ is provided with five circles numbered from 1 to 5, respectively, so that the circle 5 of said coupon lies beneath and in register with the circles 1, 2, 3, and 4 of coupons $a$, $b$, $c$, and $d$, respectively, the circle 4 lies beneath the circles 1, 2, and 3 of coupons $b$, $c$, and $d$, respectively, the circle 2 lies beneath the circle 1 of coupon $d$. The circle 1 of coupon $e$ is offset with respect to the circle 1 of coupon $d$. As indicated in Figure 6, the coupon is provided with five circles numbered 2, 3, 4, 5, and 6 respectively, and all of the subsequent coupons are also provided with a similar number of circles each being numbered, the numbers however being staggered one unit to the left in each instance. This condition continues up to and including the coupon f, which in the illustration selected shows five circles 12 designated 28, 29, 30, 31, and 32 respectively. The coupon g is provided with four of said circles numbered 29, 30, 31, and 32 which register respectively with the circles 28, 29, 30, and 31 of coupon f. The coupon h is provided with three of the circles 12 numbered 30, 31, and 32, respectively, registering with the circles 28, 29, and 30 of coupon f, and the circles 29, 30, and 31 respectively of coupon g. Coupon i is provided with two circles numbered 31 and 32 which register with the circles 28 and 29 of coupon f, 29 and 30 of coupon g, 30 and 31 of coupon h. The coupon j is provided with a single circle 32 which registers with circle 28 of coupon f, circle 29 of coupon g, circle 30 of coupon h, circle 31 of coupon i.

As has already been stated, a coupon book designed for 32 payments has been selected for purposes of illustration, although the invention is not to be limited in this respect. However, for a 32 payment coupon book 36 coupons are required including four coupons with the payment numbered circles 12 corresponding to coupons a, b, c, and d respectively of Figures 1, 2, 3, and 4. There must also be contained at the end four coupons corresponding to coupons g, h, i, and j of Figures 9, 10, 11, and 12, respectively. In other words, there are four more coupons to the book than the total number of payments to be made, and the arrangement of the payment numbers is such that if the payments are to start in the first week of any month of the calendar year, a punch mark through the superposed and registering circles 12 of all of the coupons from the topmost coupon to the bottom one will punch circles 12 numbered consecutively and continuously from one to the end of the series. In other words, a punch mark through all of the circles 12 in register with circle numbered 1 of coupon a would punch thirty two superposed circles bearing continuously successive numbers from 1 to 32 both inclusive. The punch mark however, would penetrate coupons g, h, i, and j at positions to the right of the circles on said coupons. Thus, the series would end with coupon f, and the coupons g, h, i, and j being superfluous, would be removed.

If the payments are to start in the second week of any calendar month, the topmost coupon a is removed and the punch mark through the series of circles 12 which register with the numeral 1 of coupon b will designate the consecutively numbered coupons of the series, in a manner already described, and inasmuch as this series would end with the coupon g, the coupons h, i, and j will be removed. In a similar manner if the payments are to start in the third week of any calendar month, the coupons a and b are removed, the punch mark is made through the series of circles 12 in register with the numeral 1 of coupon c, and coupons i and j are removed. If the payment is to start in the fourth week of any month coupons a, b, c, and j are removed and the coupons punched as before indicated. If the payments are to start in any week in which there are days in two adjoining months, coupons a, b, c, and d are removed so that the coupon e becomes the first coupon of the payment, and the coupon j becomes the last of the series.

Each coupon is provided with a space 13 bearing designations 14 of the 12 calendar months of the year arranged in continuous consecutive order. For convenience and to reduce the amount of space required, these monthly indications are divided into two groups which are separated by a vertical line 14ᵃ.

In alignment with each month indication is a series of spaces indicated by circles 15, there being seven of such spaces opposite each month designation on each coupon. The lines of spaces 15 on coupon a are numbered from 1 to 7 respectively. Those on coupon b are numbered from 8 to 14 respectively, the circle 8 of coupon b registering with the circle 1 of coupon a, and the successive circles of coupon b registering in a similar manner with the successive circles of coupon a. The circles 15 of coupon c are numbered 15 to 21 respectively and the circles 15 of coupon d are numbered from 23 to 29 respectively. The circles of the respective coupons register in such manner that a punch mark through any circle will indicate seven day intervals downwardly from the topmost coupon to the last coupon of the series. It will be noted that the month indicia on coupon e are duplicated because of the fact that this coupon represents weekly periods in which the days of the week are made up of portions of two successive months. For instance, the topmost row of circles 15 in the left hand section contain numerals 29, 30, and 31 indicating the last three days of January and numerals 1, 2, 3, and 4 indicating the first four days in February. The second row contains the first seven days of March; the third row the last three days of March associated with the first four days of April. The fourth line contains the last two days of April and the first five days of May. The fifth line contains the last three days of May and the first four days of June. The last line in the left section contains the last two days of June and the first five days in July.

The top line of the right hand section bears the last three days of July and the first day of August. The second line of this section contains the last three days of August and the first four days of September. The third line contains the last two days of September and the first five days of October. The fourth line contains the last three days of October and the first four days of November. The fifth line contains the last two days of November and the first five days of December. And the last line contains the last three days of December and the first four days of January.

For the purpose of visually indicating the chronological demarkation between the days of adjoining months on coupon e and similar coupons, a chronological line 16 is employed, as more clearly appears in Figures 5 and 7. A similarly arranged coupon must be placed at a proper position in the coupon book at each location where the weekly designations extend from one month into the next successive month.

In other words, there must be a number of coupons corresponding with the number of payments to be made, and the circles 15 for each month must be numbered in successively continuous order from the date of the first payment to the date of the last payment. This necessitates the use of a plurality of sets of coupons each set consisting of a plurality of coupons similar to coupons *a*, *b*, *c*, and *d*, with a periodically interposed coupon similar to coupons *e* and *f*, to maintain the continuity.

In view of the foregoing, the coupon book is made up of a plurality of sets of coupons, each set including a number of coupons corresponding to the number of unbroken seven day increments from the first day to the last day of the month, such as coupons *a*, *b*, *c*, and *d* respectively, and one or more other coupons similar in type to coupons *e* and *i*, the coupons of all of the sets and the registering indicia 15 thereon being so constructed and arranged that a punch mark through any of the circles 15 will establish continuously successive due dates of payment extending downwardly from the first coupon to the last coupon and designating intervals of seven days. For instance, assuming that the payment is to start in the first week of any month, the last four coupons *g*, *h*, *i*, and *j* are removed, as before stated. Assuming the payments to commence on July 7th, a punch mark through the circle 15 designated as July 7th on coupon *a* will successively extend through the circle 15 of coupon *b*, circle 21 of coupon *c*, circle 28 of coupon *d* and the circle of August 4th of coupon *e* and so on continuously through the book. Each set of numbers of registering circles 15 of the superposed coupons being separated by seven day intervals. Therefore, the punch mark above described indicates the dates of payment at seven day intervals.

The coupons may contain any additional data suitable to the convenience of the concern with which the customer is doing business. For instance, the name and address of the customer may be indicated at 16′, the amount of each payment at 17, and the name of the credit company may be indicated at 18. Obviously, these data may be varied as may suit the desires of the credit company. The stubs S may also contain any desired correlated data. It is to be understood that although the invention is described with respect to a "32" payment contract, it is not limited in this respect, because provision for any number of weekly payments may be effected by increasing or diminishing the number of coupons, as the case may be, to meet the requirements.

In practice, the coupon book is not issued to a customer until it has been punched to designate the successive payment numbers and the dates of payment, and the superfluous coupons have been removed.

The advantages of the invention will be readily apparent to those skilled in the art to which it belongs. One of the important advantages is that very efficient means are provided for convenience of the customer who desires to make equal weekly payments, and provision is made for keeping the customer accurately informed as to the due dates of his payments, the amount previously paid and the balance due. The labor imposed upon the credit company is reduced to a minimum and danger of mistakes in handling the account is practically avoided. A most important advantage is that the book is universal in character, in that any coupon book made up as herein described may be utilized for weekly payments commencing on any day, of any week, of any calendar year, thereby avoiding the necessity of printing special sets of books for each calendar period of payments. Another advantage of the invention is that the coupon book may be quickly prepared for issue, it being necessary only to fill in the desired data as to the customer's name and address, the amount of payment and then to punch the book of coupons in two places, namely through the registering payment numbers and the registering due dates.

Having thus explained the nature of the invention and described an operative manner of constructing and using the same, although without attempting to set forth all of the forms in which it may be made, or all of the forms of its use, what is claimed is:—

1. A multiple payment coupon book comprising a plurality of coupons superposed one upon another, each coupon except the first four coupons and the last four coupons having thereon five continuously numbered identifying spaces, the first and last coupon each having a single numbered identifying space, the second coupon and the next to the last coupon each having two continuously numbered identifying spaces, the third coupon and the third from the last coupon each having three continuously numbered identifying spaces, and the fourth coupon and the fourth from the last coupon each having four continuously numbered identifying spaces, said identifying spaces being located in a predetermined position on each coupon, so that each numbered identifying space on any coupon is in register with similarly located numbered identifying spaces on all of the other coupons while the latter are in superposed relation, each identifying number on the respective coupons being a duplicate of a corresponding number of the next adjacent coupon but offset with respect thereto in such manner that all registering numbered spaces of the superposed coupons are arranged in five series of continuously consecutive numbers, respectively, running from the top coupon to the fourth from the last coupon, from the second coupon to the third from the last coupon, from the third coupon to the second from the last coupon, and from the fourth coupon to the last coupon of the superposed coupons, each coupon also containing predeterminedly positioned date indicia which are in register with correspondingly positioned date indicia of each of the other coupons while said coupons are arranged in a group and in superposed relation in the numerical order indicated by the registering continuously numbered identifying spaces running from the top to the bottom of the group of superposed coupons, so that the registering date indicia also run successively from the top to the bottom of the superposed coupons.

2. A multiple payment coupon book comprising a plurality of coupons superposed one upon the other, there being four coupons in excess of the number of payments to be made, said coupons being arranged in four series, one series consisting of all of the coupons from the first coupon to the fourth from the last coupon, another series consisting of all of the coupons from the second coupon to the third from the last coupon, a third series consisting of all of the coupons from the third coupon to the next to the last coupon and a fourth series consisting of all of the coupons from the fourth coupon to the last coupon, each coupon except the first four coupons and the last four coupons having five continuously numbered identifying spaces, the first and the last coupons each having a single identifying numbered space, the second and the next to the last coupons each having two continuously numbered identifying spaces, the third coupon and the third from the last coupon each having three continuously numbered identifying spaces, and the fourth coupon and the fourth from the last coupon each having four continuously numbered identifying spaces, said identifying spaces being arranged in a predetermined position on each of the respective coupons, so that each numbered identifying space on any coupon is in register with a correspondingly positioned numbered identifying space on each of the other coupons while the latter are in superposed relation, the numbered spaces on each of the respective coupons being a duplicate of a correspondingly numbered space on the next adjacent coupon, but offset with respect thereto in such manner that all registering numbered spaces of the superposed coupons are arranged in five series of continuously consecutive numbers running, respectively from the first coupon to the fourth from the last coupon, from the second coupon to the third from the last coupon, from the third coupon to the second from the last coupon, and from the fourth coupon to the last coupon, each coupon also containing predeterminedly positioned date indicia, the date indicia on each coupon being in register with correspondingly positioned date indicia on each of the other coupons while said coupons are arranged in a group and in superposed relation in the numerical order indicated by the registering continuously numbered identifying spaces running from the top to the bottom of the group also the registering date indicia running successively from the top to the bottom of the superposed coupons.

3. A multiple payment coupon book comprising a plurality of superposed coupons corresponding in number to the number of payments to be made, each coupon being provided with duplicate indicia designating twelve calendar months arranged respectively at the same predetermined successive positions on each coupon of the coupons of the set, and a plurality of lines of date spaces associated with the respective calendar month indicia, there being seven date spaces in each of said lines, and a line of date spaces for each calendar month, all respectively located at the same predetermined positions on all of the coupons of the set so that each date space of a line of such spaces will register with a correspondingly positioned date space in all of the other superposed coupons, each date space of each line of day indicia, of all of the coupons bearing a designation identifying a calendar day of the month with which its line is associated, said coupons being divided into a plurality of sets of coupons, each set including a number of coupons which corresponds to the number of unbroken seven day increments from the first day to the last day of a month, each set also containing one or more additional coupons on which some of the month designations are duplicated, each of said additional coupons being also provided with a plurality of lines of date spaces associated with the respective months, similar to those of the other coupons and positioned to register with the correspondingly located date spaces of said other coupons, each line of date indicia of the additional coupon embodying dates of two successive months, the coupons of each set being identified by continuously successive numbers running from the top to the bottom of the set, the day designations of each of the registering spaces of all of the successive superposed coupons of a set representing a seven day interval running downwardly through the set from the top to the bottom coupons, while the coupons of a set are arranged in their continuously successive numerical order from the top to the bottom of the set, the coupons of all of the sets and the registering indicia thereon being so constructed and arranged that a punch mark through any one of the date spaces of the respective lines of date spaces of the superposed coupons will establish continuously successive due dates of payment extending from the first coupon to the last coupon of the book and designating seven day intervals.

4. A multiple payment coupon book comprising a plurality of coupons superposed one upon another, each coupon except the first four coupons and the last four coupons having thereon five continuously numbered identifying spaces, the first and last coupon each having a single numbered identifying space, the second coupon and the next to the last coupon each having two continuously numbered identifying spaces, the third coupon and the third from the last coupon each having three continuously numbered identifying spaces, and the fourth coupon and the fourth from the last coupon each having four continuously numbered identifying spaces, said identifying spaces being located in a predetermined position on each coupon, so that each numbered identifying space on any coupon is in register with similarly located numbered identifying spaces on all of the other coupons while the latter are in registering superposed relation, each identifying number on the respective coupons being a duplicate of a corresponding number of the next adjacent coupon but offset with respect thereto in such manner that all registering numbered spaces of the superposed coupons are arranged in five series of continuously consecutive numbers, respectively, running from the top coupon to the fourth from the last coupon, from the second coupon to the third from the last coupon from the third coupon to the second from the last coupon, and from the fourth coupon to the last coupon of the superposed coupons, each coupon being provided with duplicate indicia designating twelve calendar months arranged respectively at the same predetermined successive positions on all of the coupons of the set, and a plurality of lines of date spaces associated with the respective calendar month indicia, there being seven date spaces in each of said lines, and a line of date spaces for each calendar month, all respectively located at the same predetermined positions on all of the coupons of the set so that each date space of a line of such spaces will register with a correspondingly position date space in all of the other superposed coupons, each date space of each line of day indicia, of all of the coupons bearing a designation identifying a calendar day of the month with which its line is associated, said coupons being divided into a plurality of sets of coupons, each set including a number of coupons which corresponds to the number of unbroken seven day increments from the first day to the last day of a month, each set also containing one or more additional coupons on which some of the month designations are duplicated, each of said additional coupons being also provided with a plurality of lines of date spaces associated with the respective months, similar to those of the other coupons and positioned to register with the correspondingly located date spaces of said other coupons, each line of date indicia of the additional coupon embodying dates of two successive months, the day designations of each of the registering spaces of all of the successive superposed coupons of a set representing a seven day interval running downwardly through the set from the top to the bottom coupons while the coupons of the set are in superposed relation in the numerical order indicated by the registering continuously numbered identifying spaces running from the top to the bottom of the set, the said arrangement of said coupons and the registering indicia thereon being such that a punch mark through any one of the date spaces of the respective lines of date spaces of the superposed coupons will establish continuously successive due dates of payment extending from the first coupon to the last coupon of the book and designating seven day intervals.

EDWARD A. KELLY.